US008941735B2

(12) United States Patent
Mariadoss

(10) Patent No.: US 8,941,735 B2
(45) Date of Patent: Jan. 27, 2015

(54) NETWORK BASED REAL-TIME ANALYTICS OF RAW VIDEO STREAMS

(75) Inventor: Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/618,154

(22) Filed: Sep. 14, 2012

(65) Prior Publication Data

US 2013/0271598 A1 Oct. 17, 2013

Related U.S. Application Data

(63) Continuation-in-part of application No. 12/180,431, filed on Jul. 25, 2008, now Pat. No. 8,325,228.

(51) Int. Cl.
*H04N 7/00* (2011.01)
*G06F 3/00* (2006.01)
(Continued)

(52) U.S. Cl.
CPC .......... *G06F 3/005* (2013.01); *G08B 13/19613* (2013.01); *G08B 13/19656* (2013.01); *G08B 13/19669* (2013.01); *H04N 7/181* (2013.01); *H04N 21/21805* (2013.01); *H04N 21/23418* (2013.01); *H04N 21/41407* (2013.01); *H04N 21/44218* (2013.01); *H04N 21/443* (2013.01);
(Continued)

(58) Field of Classification Search
CPC ................... G08B 13/19613; G08B 13/19669; H04N 21/21805; H04N 21/41407; H04N 21/443; H04N 21/64322; H04N 21/25891; H04N 21/4431

USPC ......................................................... 348/143
See application file for complete search history.

(56) References Cited

U.S. PATENT DOCUMENTS 6,795,863 B1 9/2004 Doty, Jr.
6,950,467 B2 9/2005 Yoo
(Continued)

FOREIGN PATENT DOCUMENTS

EP 0645725 A2 3/1995
WO 0072186 A2 11/2000

OTHER PUBLICATIONS

Taniguchi, Y., et al., "SceneCabinet: A Video Indexing System Integrating Video Analysis Techniques", IEICE Transactions on Information and Systems, Pt. 2, vol. J84-D-2, No. 6, pp. 1112-1121, 2001.
(Continued)

*Primary Examiner* — David X Yi
(74) *Attorney, Agent, or Firm* — Patents on Demand P.A.; Brian K. Buchheit; Scott M. Garrett

(57) ABSTRACT

A video stream is received over a network from a remotely located video capture device. The video stream is processed in real-time or near real time. The processing of the video stream extracts at least one metric from content of the video stream. The extracted metric is compared against at least one previously established value to generate either a TRUE or a FALSE result. Responsive to a TRUE result, at least one programmatic action is automatically initiated. The previously established value, the programmatic action, or both are user configurable. The programmatic action is a real time or a near real time action resulting from analyzing content of the video stream. Responsive to a FALSE comparison result, the at least one programmatic action is not automatically initiated.

17 Claims, 3 Drawing Sheets

(51) Int. Cl.
- *G08B 13/196* (2006.01)
- *H04N 7/18* (2006.01)
- *H04N 21/218* (2011.01)
- *H04N 21/234* (2011.01)
- *H04N 21/414* (2011.01)
- *H04N 21/442* (2011.01)
- *H04N 21/443* (2011.01)
- *H04N 21/478* (2011.01)
- *H04N 21/643* (2011.01)
- *H04N 21/258* (2011.01)
- *H04N 21/41* (2011.01)
- *H04N 21/81* (2011.01)

(52) U.S. Cl.
CPC ....... *H04N 21/478* (2013.01); *H04N 21/64322* (2013.01); *H04N 21/25891* (2013.01); *H04N 21/4126* (2013.01); *H04N 21/4431* (2013.01); *H04N 21/814* (2013.01)

USPC .......................................................... 348/143

(56) References Cited

U.S. PATENT DOCUMENTS

| | | |
|---|---|---|
| 7,114,174 B1 | 9/2006 | Brooks et al. |
| 2007/0013776 A1 | 1/2007 | Venetianer et al. |
| 2007/0220165 A1 | 9/2007 | Moorer et al. |

OTHER PUBLICATIONS

Roli, F., et al., "A Multi-Expert System for Movie Segmentation", Trans. of Inst. of Electronics, Info. and Comm. Engineers D-II, vol. J85D-II, No. 6, pp. 1112-1121, Jun. 2001.

Veloso, E., et al., "A Hierarchical Characterization of a Live Streaming Media Workload", IEEE/ACM Transactions on Networking, vol. 14, No. 1, Feb. 2006.

Girgensohn, A., et al., "Support for Effective Use of Multiple Video Steams in Security", Oct. 27, 2006.

NETWORK BASED REAL-TIME ANALYTICS OF RAW VIDEO STREAMS

CROSS-REFERENCE TO RELATED APPLICATIONS

This application is a continuation in part of U.S. patent application Ser. No. 12/180,431, filed Jul. 25, 2008 (pending), which is incorporated herein in its entirety.

BACKGROUND

The present invention relates to the field of video analytics and, more particularly, to performing real-time analytics using a network processing solution able to directly ingest internet protocol (IP) camera video streams.

Intelligent video surveillance (IVS) plays a pivotal role in managing threats, maintaining safety, and assisting in security. IVS systems provide analytics, alert first responders during an incident event, and provide a deterrent to potential aggressors. Many intelligent video surveillance systems require intermediate systems such as video management systems (VMSs) to organize surveillance artifacts (e.g., cameras, locations, footage, etc). That is, a local VMS is effectively a local hub, which peripheral devices (e.g., video cameras, microphones, surveillance sensors, etc.) connect. Local VMSs can process the received input, can record timed video, and can perform other programmatic tasks.

A number of network solutions (IBM's Smart Surveillance Solution, for example) exist which provide services to enhance capabilities of existing VMSs. These network solutions can integrate data from multiple sensors and analog and digital cameras into one searchable system, can permit searching of data according to a broad range of parameters (e.g., time, date, alert, object, size, location, and color), can share data across agencies, countries and departments, can permit information to be accessed and viewed remotely from a Web browser, can prioritize critical events and store video associated with these events in long term storage, and can analyze footage for perpetrator identification, theft prevention and damage detection, customer behavior, etc.

Conventional network solutions are designed to only interact with VMSs. Many potential customers, however, do not possess a VMS and/or would desire to minimize their video surveillance costs by retiring an existing VMS, if an option existed to receive desired services directly from a network solution provider. For example, many individuals and/or entities desire capabilities of video analytics, which is a capability generally lacking or non-robust in all but the highest end VMSs. It would be beneficial if network solutions providing video processing capabilities, such as analytics, were made more accessible by eliminating the requirement, which often functions as an entry barrier, of possessing a VMS.

BRIEF SUMMARY

In one embodiment of the disclosure, a method, computer program product or system can receive a video stream over a network from a remotely located video capture device. The video stream is processed in real-time or near real time. The processing of the video stream extracts at least one metric from content of the video stream. The extracted metric is compared against at least one previously established value to generate either a TRUE or a FALSE result. Responsive to a TRUE result, at least one programmatic action is automatically initiated. The previously established value, the programmatic action, or both are user configurable. The programmatic action is a real time or a near real time action resulting from analyzing content of the video stream. Responsive to a FALSE comparison result, the at least one programmatic action is not automatically initiated.

In one embodiment of the disclosure, a system can perform video analytics. The system can include at least a video surveillance system, a filter, and a software engine. The video surveillance system ingests video streams from a remotely located video capture device. The video surveillance system performs real-time or near-real time video analytics on the video stream. The filter is specific to the remotely located video capture device that is an application programming interface (API). The video surveillance system is unable to process the video stream received from the video capture device in absence of the application program interface. The software engine can include program instructions stored in at least one non-transitory medium. The program instructions are able to be executed by at least one processor to perform at least one programmatic action responsive to results produced by an analytics engine that performs the real-time analytics. The at least one action is a notification action that conveys a notification to at least one previously designated user when a previously established condition is automatically detected by the analytics engine.

DETAILED DESCRIPTION

Figure 1:
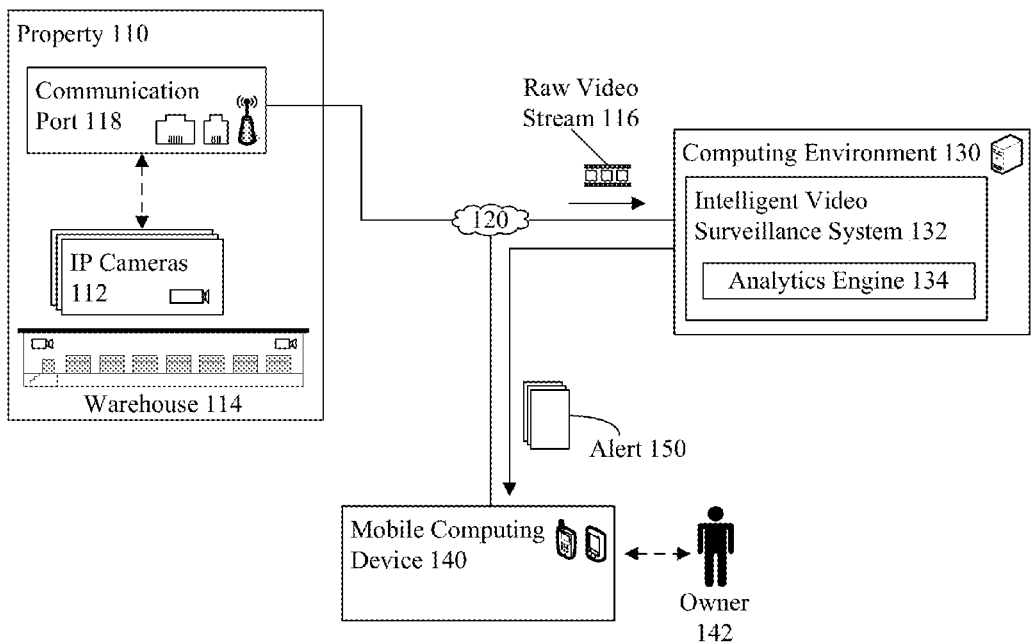
FIG. 1 is a schematic diagram illustrating a set of scenario for directly ingesting raw video streams from internet protocol (IP) cameras and performing real-time analytics on the received video streams in accordance with an embodiment of the inventive arrangements disclosed herein.
Figure 1:
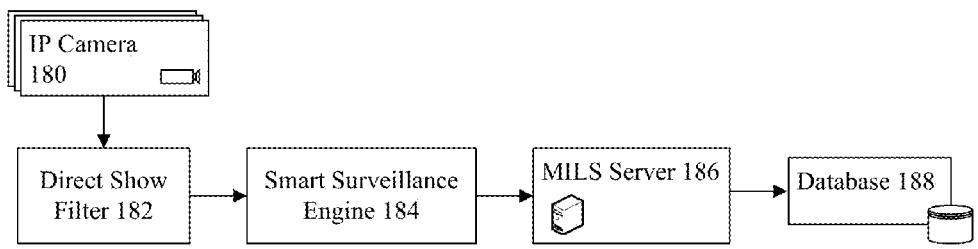

Embodiments of the present invention disclose a solution for performing real-time analytics using input from internet protocol (IP) cameras directly connected to a network, where the analytics are performed by a remotely located network element. In the solution, a network element providing intelligent video surveillance (IVS) services is able to directly interact with raw output of a set of one or ore IP cameras. No video management system (VMS) intermediary is needed or is existent between the IP cameras and the remotely located IVS service provider. The IVS service provider can perform real-time analytics a video stream directly ingested from one or more IP cameras. Real-time analytics performed on the stream can include face recognition, object tracking, motion detection, and the like.

In one embodiment, an owner of an IP camera or an establishment where the IP cameras are deployed can establish user/location specific profile settings. These profile settings can specify thresholds and elements to be examined by analytic processing operations and can establish user specific programmatic actions to be performed based the analytic processing results. Programmatic action can include, for example, notification, alerts, programmatic actions altering a localized system, and the like. Profile settings can be arbitrarily complex which can include multiple IP camera video streams, one or more analytics per stream, and the like.

Embodiments of the invention permit complex digital signal processing (DSP) and video based analytics to be performed in real time or near real time by network based computers. For example, these analytics can be performed as a Web service or other software service. Thus, instead of requiring end-users to host and purchase expensive video analytics hardware and software, raw video captured at a customer location can be analyzed. This analysis can occur rapidly, which permits real-time responses on location.

For example, a video capture device located in a store can capture a video of a theft, which is undetected by in-store personnel. This video can be streamed over a network, where metrics are extracted during processing. These metrics can be compared against established values to determine that a consumer is attempting to shoplift an item by hiding it in his/her closing without payment. Appreciably, such detailed analytics can require substantial computing processing power and logic, which is beyond the ability of all but the highest end security systems available today. Once the shoplifting attempt is determined, a TRUE comparison result can be generated, which triggers a programmatic action to immediately inform the store of the ongoing theft. When a FALSE comparison result (no shoplifting or other adverse event detected by video analysis), no action or message is sent. The store owners can be informed through a message, notification, call, or other electronic means. Thus, the programmatic action can be as simple as sending a message. The message may include a portion of the video showing the theft and/or an analysis of what occurred, which provides proof to the responder of the incident.

In another example, a street level camera can capture video of an accident. This raw video can be streamed over the network for processing. The processing can automatically indicate an incident has occurred, which evaluates as a TRUE comparison result. The programmatic action triggered can be to provide the accident video to a device of a responding officer, who can utilize this information for his/her report. In another embodiment, a report can be partially generated/completed automatically based on video analytics, which can save a responding officer a considerable amount of time. Additionally, programmatic actions can immediate contact responders, such as an ambulance service, to ensure that help arrives on a scene as rapidly as possible. Similar analytic actions can detect a fire in progress (evaluated as a TRUE condition), which triggers a programmatic action of informing fire department responders.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenario 105, 160 for directly ingesting raw video streams from internet protocol (IP) cameras and performing real-time analytics on the received video streams in accordance with an embodiment of the inventive arrangements disclosed herein. In scenario 105, warehouse 114 owner 142 can utilize a surveillance service to monitor property 110. Service provided by computing environment 130 can include IP cameras 112 directly connected to an intelligent video surveillance (IVS) system 132. Ingested video 116 can be used to surveil property 110 using real-time analytics. When incident events occur, alert 150 can be conveyed to owner 142 via mobile computing device 140. Scenario 160 can represent a contemplated embodiment of scenario 105 unlike prior art where IP cameras 112 are connected indirectly to an IVS system 130 via a video management system. In one embodiment, standard communication protocols can be utilized for communicating between the IP camera 112 and the IVS system 132 and between the IVS system 132 and the mobile computing device 140.

In scenario 105, IP cameras 112 can be connected to intelligent video surveillance system 132 via communication port 118. Communication port 118 can include physical connections such as Ethernet, twisted pair, wireless communication ports, and the like. Physical layer components and network technologies can vary based on camera 112, port 118 and network 120 configurations. Raw video stream 116 can be conveyed from property 110 via network 120 directly to IVS system 132 without being treated by a video management system.

Engine 134 can receive and decode raw video stream 116 prior to performing analytics on stream 116. Default analytics established by computing environment 130 and IVS system 132 can be combined with owner 142 settings to provide customized monitoring for property 110. For instance, to reduce the likelihood of false alerts from facial recognition, owner 142 can provide portrait pictures of authorized personnel for property 110. Analytics engine 134 can be used to detect incident events which can include, motion detection, object tracking, presence detection, and the like.

Mobile computing device 140 can be a portable hardware/software device able to receive alerts 150 and communicate with computing environment 130. Device 140 can include mobile phone, personal digital assistant (PDA), laptop, ultra-mobile computing devices, and the like. The device 140 need not be a portable device, but can be any device (e.g., a personal computer, a home telephone, etc.) able to receive communicated notifications.

Computing environment 130 can include a set of software components able to provide monitoring and analysis functionality. For example, environment 130 can be a JAVA 2 ENTERPRISE EDITION (J2EE) environment 130, such as IBM's WEBSPHERE. Functionality can be embodied as Web services which can include remote control, monitoring, reporting, and the like. Components can include intelligent video surveillance system 132 and analytics engine 134. In one embodiment, IVS system 132 can be implemented within a middleware software platform.

In scenario 160, an IP camera 180 can convey a raw video stream to a smart surveillance engine (SSE) 184. SSE 184 utilizing DIRECT SHOW filter 182 can process the raw video stream received from IP camera 180. DIRECTSHOW filter 182 can be a software application programming interface (API) able to decode Motion Picture Experts Group (MPEG), Motion Joint Photographic Expert Group (M-JPEG), and the like. Decoded video streams can be analyzed in real-time by SSE 184 to provide notifications and alerts to appropriate entities. Middleware for Large Scale Surveillance (MILS) server 168 can provide consolidation, management, and access for video streams processed by SSE 184. In one embodiment, MILS server 168 can be a JAVA 2 ENTERPRISE EDITION (J2EE) software platform. Metadata exported from video streams can be indexing and managed using database 118.

Figure 2:
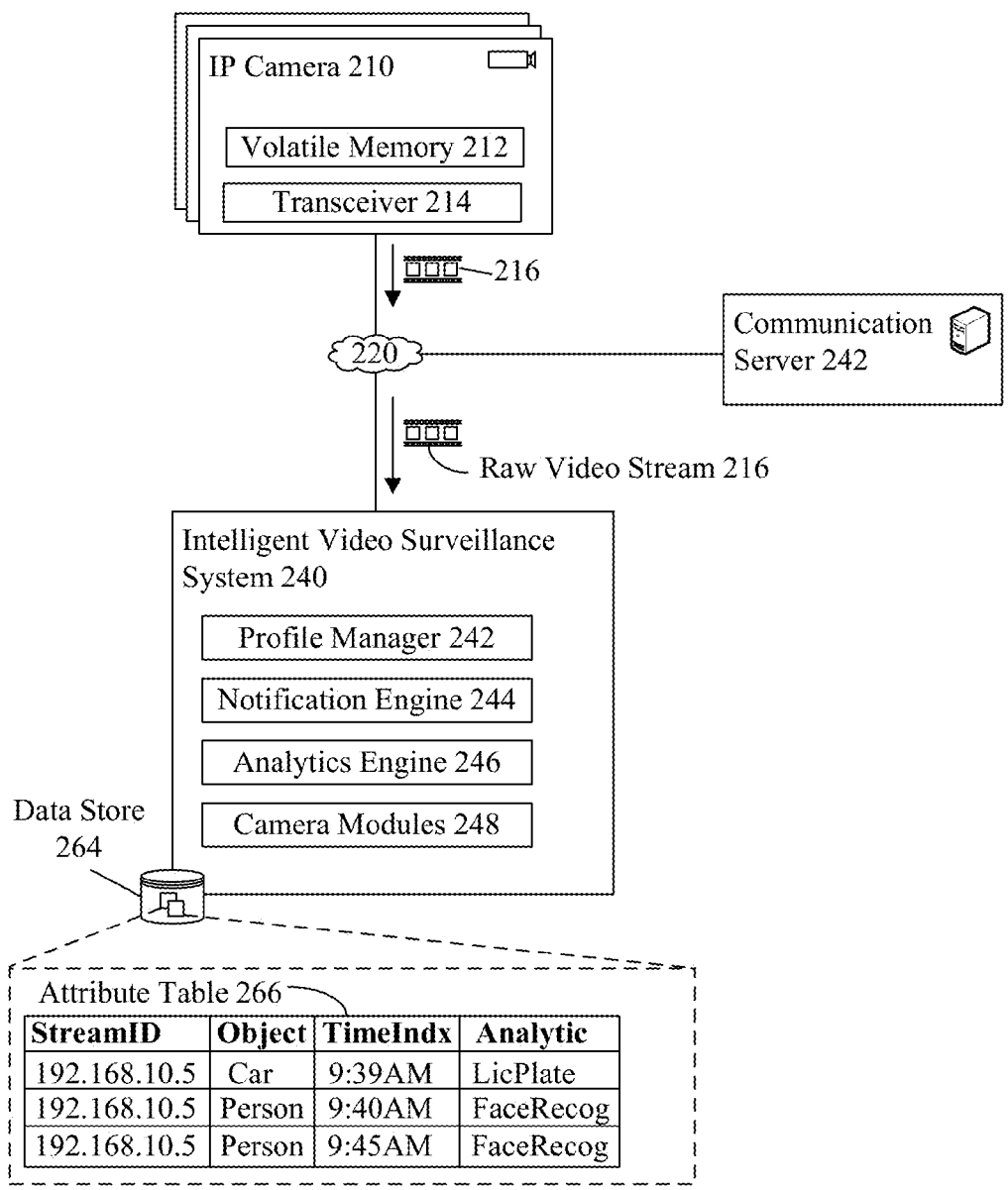
FIG. 2 is a schematic diagram illustrating a system for providing real-time analytics on directly ingested IP camera video streams in accordance with an embodiment of the inventive arrangements disclosed herein.

FIG. 2 is a schematic diagram illustrating a system 200 for providing real-time analytics on directly ingested IP camera video streams in accordance with an embodiment of the inventive arrangements disclosed herein. In system 200, intelligent video surveillance system 240 can provide real-time analysis of video stream 216 provided by directly connected IP camera 210. System 240 determining an incident event (e.g., unattended object) can respond by notifying/alerting associated entities, altering the state of cameras 210 and/or surveillance system 210.

As used herein, IP cameras 210 can include cameras able to convey a video stream to an IVS system using one or more internet protocols. The IVS system 240 can be one or more component systems lacking an intermediate video management system. System 240 can be able to record, monitor, perform real-time analytics, and reporting on IP camera 210 streams. Real-time analytics can encompass real-time and near real-time analysis of video streams.

IP camera 210, which can include volatile memory 212 and transceiver 214, can convey raw video stream 216 to IVS 240. Video information received from camera 210 optics can be temporarily stored in volatile memory 212 prior to transmission. Transmission of video stream 216 to IVS 240 can be facilitated by transceiver 214 which can convey stream 216 via network 220. In one embodiment, raw video stream 216 can include an H.264 MPEG4 encoded video stream.

IVS 240 can receive and process raw video stream 116 to condition the stream for analytics. Processing can be predicated on camera modules 248 which can allow IVS 240 to interface with vendor specific camera configurations. In one embodiment, modules 248 can be a plug-in based framework allowing vendor specific application programming interfaces (APIs) to interoperate with IVS 240. Modules 248 can enable IVS 240 to perform actions such as query camera data, enable remote control of cameras, and the like.

Once processed, video stream 216 can be analyzed and incident events can be identified. Analytics engine 246 can perform one or more examinations of video stream 216. In one embodiment, one or more frames of video stream 216 can be analyzed based on one or more specialized algorithms. Algorithms can include, but is not limited to, face recognition, path tracking, object tracking, motion detection, presence detection, and the like. Extracted data from video stream 216 can be stored in data store 264. Data can include, but is not limited to, attribute data 266, incident information, actions taken in response to incident events, and the like. For instance, attribute table 266 data can be used to index and search processed video streams quickly.

Profile manager 242 can permit user and/or camera specific settings to be maintained for a set of IP cameras 210. For instance, analytics such as object tracking and license plate identification can be enabled for cameras surveilling a loading dock at a warehouse. Manager 242 can be utilized to maintain user notification settings which can vary based on camera, analytics, incident events, and the like.

Notification engine 244 can be used to provide alerts to users, authorities, first responders, and the like. When an incident event occurs, notification engine 244 can communicate messages to one or more user configured devices. Further, engine 244 can be used to manage varying degrees of critical alerts. For instance, when motion is detected in a non-critical area of surveillance, a text exchange message can be delivered to a user notifying of a possible presence.

Communication server 242 can enable IVS 240 to execute one or more communication functions in response to real-time analytics performed. Server 242 can include, but is not limited to, a text exchange server, telephony server, facsimile server, and the like. Although presented as a separate entity communication server 242 functionality can be expressed in IVS system 240.

Figure 3:
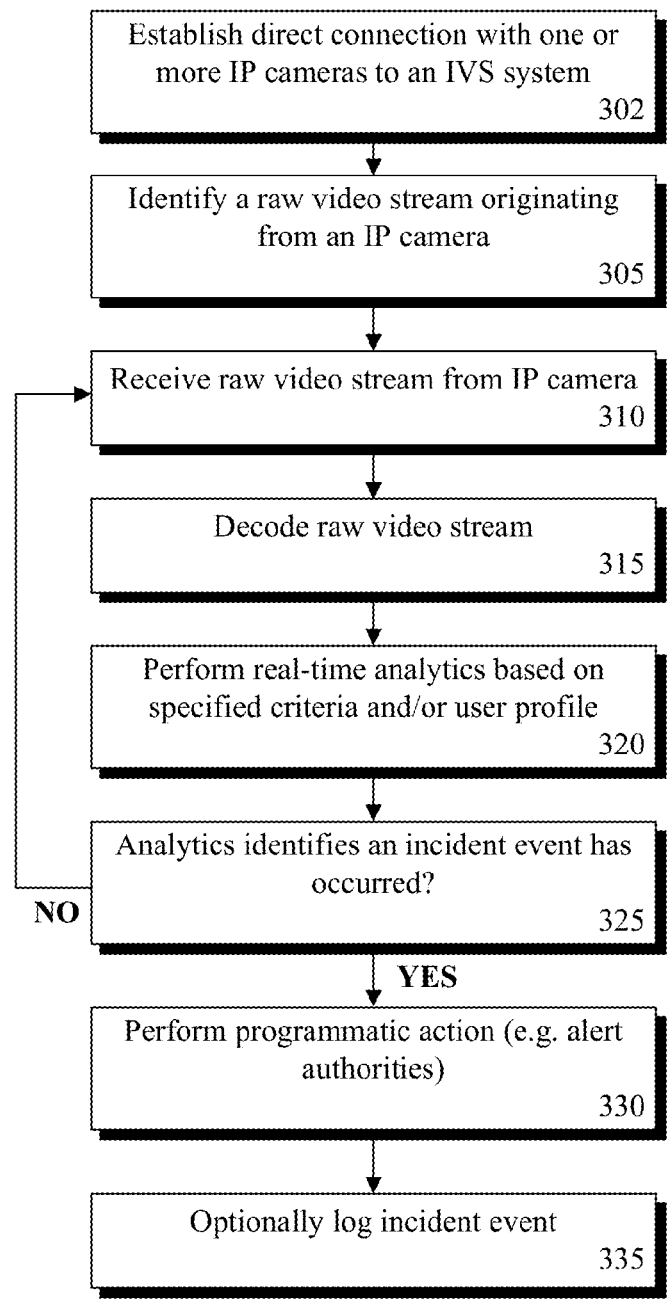
FIG. 3 is a flowchart illustrating a method for executing real-time analytics on directly ingested internet protocol (IP) camera video streams in accordance with an embodiment of the inventive arrangements disclosed herein.

FIG. 3 is a flowchart illustrating a method 300 for executing real-time analytics on directly ingested internet protocol (IP) camera video streams in accordance with an embodiment of the inventive arrangements disclosed herein. Method 300 can be performed in the context of system 200. In method 300, one or more IP cameras can convey video streams directly to an intelligent video surveillance (IVS) system which can initiate real-time analytics on the video streams.

As used herein, IP cameras can include cameras able to convey a video stream to an IVS system using one or more internet protocols. The IVS system can be one or more component systems lacking an intermediate video management system able to record, monitor, perform real-time analytics, and reporting. Real-time analytics can encompass real-time and near real-time analysis of video streams. The analytics, which need not occur in real time, can also be performed after an arbitrary delay.

In step 302, one or more IP cameras can establish a direct connection to an IVS system. In step 305, the IVS system can identify a raw video stream originating from an IP camera. In step 310, the raw video stream from the IP camera can be received. In step 315, the raw video stream can be decoded and processed. In step 320, real-time analytics can be performed on the video stream based on one or more processing criteria and/or user profile settings. Criteria/settings can include, face recognition, path tracking, object tracking, motion detection, and the like. In step 325, if analytics identifies an incident event has occurred, the method can proceed to step 330, else return to step 310. In step 330, a programmatic action can be performed by the IVS system. Actions can include notification and/or alerting appropriate entities, altering a localized system state (e.g., zooming/panning a camera), adjusting analytics, and the like. In step 335, the IVS system can optionally log the incident event in a system log, user history log, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   one or more computers receiving a video stream over a network from a remotely located video capture device;
   at least one of the one or more computers processing the video stream in real-time or near real time, wherein the processing of the video stream extracts at least one metric from content of the video stream, wherein the one or more computers process the video stream using an application program interface (API), wherein the processing comprises decoding the video stream from the remotely located video capture device, and wherein the application program interface is a filter specific to the remotely located video capture device, wherein different types, versions, and varieties of video capture devices are associated with different filters or APIs, wherein the processing occurs using an analytics engine that is a component of an intelligent video surveillance system that is unable to process the video stream in absence of the application program interface;
   at least one of the one or more computers comparing the extracted metric against at least one previously established value to generate either a TRUE or a FALSE result;
   responsive to a TRUE result, at least one of the one or more computers automatically initiating at least one programmatic action, which comprises a notification action that conveys a notification to at least one previously designated user when a previously established condition is automatically detected by the analytics engine, wherein the previously established value, the programmatic action, or both are user configurable, and wherein the programmatic action is a real time or a near real time action resulting from analyzing content of the video stream; and responsive to a FALSE comparison result, the one or more computers not initiating the at least one programmatic action.

2. The method of claim 1, wherein the video stream captures input from a geospatial region, wherein an authorized entity is able to configure the established value, the programmatic action, or both is has responsibility and authority over the geospatial region.

3. The method of claim 1, wherein the video capture device is a network connected IP camera.

4. The method of claim 1, wherein the received video stream is raw, unprocessed video captured by a video capture device.

5. The method of claim 1, further comprising:
at least one of the one or more computers determining a processing filter for the video capture device from a plurality of different processing filters, each of the different processing filters being mapped to different video capture devices or to different types of video capture devices, wherein the processing uses the determined processing filter.

6. The method of claim 1, wherein said at least one programmatic action further comprises is at least one of an alert and an action altering the state of a localized entity.

7. The method of claim 1, wherein the processing of the video stream and the comparing of the extracted metric are performed as part of an object tracking analysis of the video stream performed by the one or more computers.

8. The method of claim 1, Wherein the processing of video stream and the comparing of the extracted metric are performed as part of a face recognition analysis of the video stream performed by the one or more computers.

9. The method of claim 1, wherein the processing of the video stream and the comparing of the extracted metric are performed as part of a motion detection analysis of the video stream performed by the one or more computers.

10. The method of claim 1, wherein the one or more computers are part of a middleware implemented solution for processing received video streams.

11. The method of claim 1, wherein the received video stream is a raw, real-time video stream from a network connected IP camera, which is the remotely located video capture device.

12. The method of claim 1, wherein the comparing is performed as part of one of more of: a face recognition process, an object tracking process, and a motion detection process.

13. The method of claim 1, wherein the initiated programmatic action conveys an alert state, an alert, or the notification to an entity owning or controlling the geographic region from which the video stream was captured.

14. The method of claim 1, wherein the processing of the video stream comprises:
exporting metadata from the video stream; and
indexing the metadata within a database system.

15. A computer program product comprising:
a non-transitory computer usable storage medium storing computer usable program code;
computer usable program code being executable by at least one processor to receive a video stream over a network from a remotely located video capture device;
computer usable program code being executable by at least one processor to process the video stream in real-time or near real time, wherein the processing of the video stream extracts at least one metric from content of the video stream, wherein the processing of the video stream using an application program interface (API), wherein the processing comprises decoding the video stream from the remotely located video capture device, and wherein the application program interface is a filter specific to the remotely located video capture device, wherein different types, versions, and varieties of video capture devices are associated with different filters or APIs, wherein the processing occurs using an analytics engine that is a component of an intelligent video surveillance system that is unable to process the video stream in absence of the application program interface;
computer usable program code being executable by at least one processor to compare the extracted metric against at least one previously established value to generate either a TRUE or a FALSE result;
computer usable program code being executable by at least one processor to, responsive to a TRUE result, automatically initiate at least one programmatic action, which comprises a notification action that conveys a notification to at least one previously designated user when a previously established condition is automatically detected by the analytics engine, wherein the previously established value, the programmatic action, or both are user configurable, and wherein the programmatic action is a real time or a near real time action resulting from analyzing content of the video stream; and
computer usable program code being executable by at least one processor to, responsive to a FALSE comparison result, not initiate the at least one programmatic action.

16. The computer program product of claim 15, wherein the video stream captures input from a geospatial region, wherein an authorized entity is able to configure the established value, the programmatic action, or both is has responsibility and authority over the geospatial region.

17. A system for performing video analytics comprising:
a video surveillance system, comprising one or more processors for ingesting video streams from a remotely located video capture device, wherein said video surveillance system performs real-time or near-real time video analytics on the video stream;
a filter specific to the remotely located video capture device that is an application programming interface (API), wherein the video surveillance system is unable to process the video stream received from the video capture device in absence of the application program interface; and
a software engine, comprising program instructions stored in at least one non-transitory medium, said program instructions able to be executed by at least one processor to perform at least one programmatic action responsive to results produced by an analytics engine that performs the real-time analytics, wherein at least one action that the software engine is configured to automatically perform is a notification action that conveys a notification to at least one previously designated user when a previously established condition is automatically detected by the analytics engine, wherein the analytics engine:
compares the extracted metric against at least one previously established value to generate either a TRUE or a FALSE result;
responsive to a TRUE result, automatically initiates the at least one programmatic action, wherein the previously established value, the programmatic action, or both are user configurable, and wherein the programmatic action is a real time or a near real time action resulting from analyzing content of the video stream: and
responsive to a FALSE comparison result, does not initiate the at least one programmatic action.

\* \* \* \* \*